United States Patent [19]

Mori

[11] 4,067,604
[45] Jan. 10, 1978

[54] VEHICLE ROOF
[75] Inventor: Keizi Mori, Toyota, Japan
[73] Assignee: Aisin Seiki Kabushiki Kaisha, Japan
[21] Appl. No.: 729,673
[22] Filed: Oct. 5, 1976
[30] Foreign Application Priority Data
Oct. 7, 1975  Japan ............................... 50-137703
[51] Int. Cl.$^2$ ............................................. B60T 7/22
[52] U.S. Cl. ............................................... 296/137 J
[58] Field of Search ................. 296/137 E, 137 F, 91, 296/1 S, 137 J

[56] References Cited
U.S. PATENT DOCUMENTS

| 3,329,462 | 7/1967 | Baur | 296/91 |
| 3,904,239 | 9/1975 | Jardin | 296/137 J |

FOREIGN PATENT DOCUMENTS

| 2,338,797 | 2/1975 | Germany | 296/137 E |
| 980,012 | 1/1965 | United Kingdom | 296/137 J |

Primary Examiner—Robert R. Song
Attorney, Agent, or Firm—Burns, Doane, Swecker & Mathis

[57] ABSTRACT

A vehicle roof having a roof aperture which can be closed by a sliding roof, the vehicle having a wind deflector pivotally positioned on the front edge of the roof aperture such that the deflector, when in its inoperative position, is disposed under the closed sliding roof, is pivoted upwardly into an operative position above the roof aperture and extending transversely to the air current.

2 Claims, 7 Drawing Figures

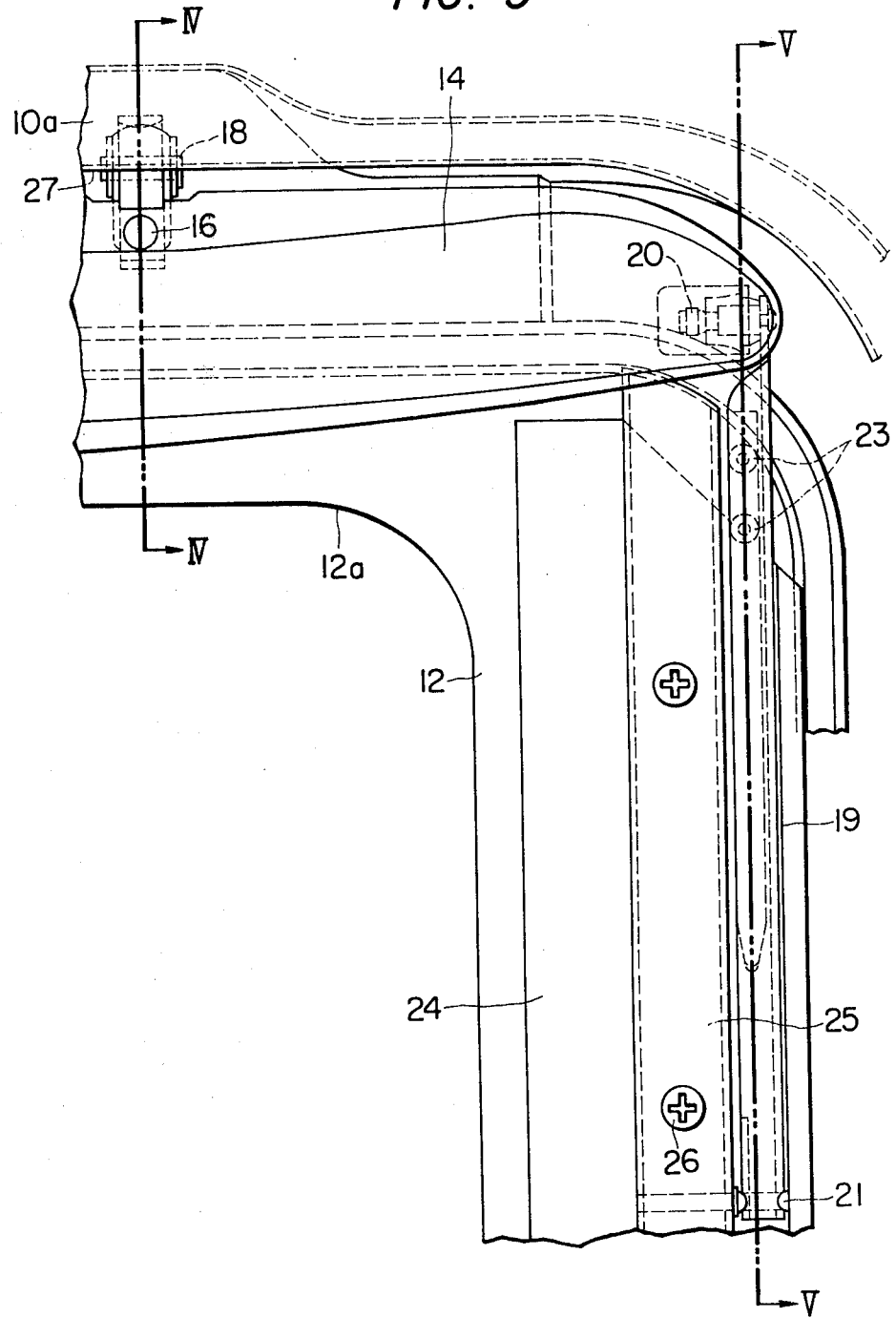

1

VEHICLE ROOF

BACKGROUND OF THE INVENTION

This invention relates to a vehicle roof, and more particularly to a vehicle roof having a roof aperture which can be closed by a sliding roof, the vehicle having wind deflecting means pivotally positioned on the front edge of the roof aperture such that said means, when in its inoperative position, is disposed under the closed sliding roof, is pivoted upwardly into an operative position above the roof aperture and extending transversely to the air current. Such wind deflecting means, as is well known in the art, operates to protect occupants in the vehicle from incoming air currents by deflecting the air stream upwardly and away from the aperture at the front thereof.

SUMMARY OF THE INVENTION

It is an object of the present invention to provide such wind deflecting means that is enabled to leave the effective area of the roof aperture maximum.

It is another object of the invention to provide a wind deflector of simpler and accordingly cheaper structure.

Still another object of the invention is to provide a wind deflector in which is employed a link and lever arrangement adapted to provide toggle action somewhat like self-locking against the reversal of the lever moments exhibited by the deflector by virtue of incoming air stream.

With these and other objects in view, the present invention comprises a roof, an aperture in the roof and a sliding roof portion movable between retracted and extended positions for respectively opening and closing said aperture.

The invention further includes a frame along the opening edge of the aperture for strengthening the aperture, an air deflector mounted on the frame adjacent a front edge of the aperture for diverting the air stream with the roof portion retracted, swingable arm means pivoted to the deflector at one end and at the other end carried by the frame in the path of the sliding roof portion in driven abutment engagement therewith, and control means for controlling the deflector in shifting between the operative position and inoperative position.

The invention still further includes spring means for normally urging said swingable arm means toward the operative position of the deflector.

The control means for controlling the deflector is formed of an arm fixed either to said deflector or said frame and having a cam slot and a hinge pin fast on the remainder of the deflector and frame and being a sliding fit within the cam slot to thereby control movement of the deflector between operative and inoperative positions and attitude of the deflector in either position.

BRIEF DESCRIPTION OF THE DRAWINGS

FIG. 3 is a top plan view of the right-hand half and forward half of the vehicle roof with the sliding roof opened.

DESCRIPTION OF THE PREFERRED EMBODIMENTS

Figure 1:
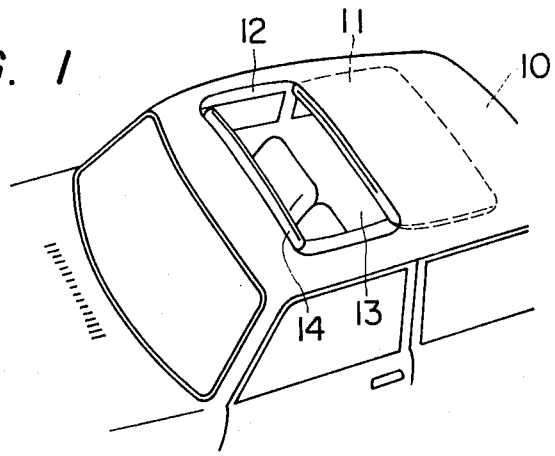
FIG. 1 is a diagrammatic partial perspective view of a motor vehicle roof.
Figure 2:
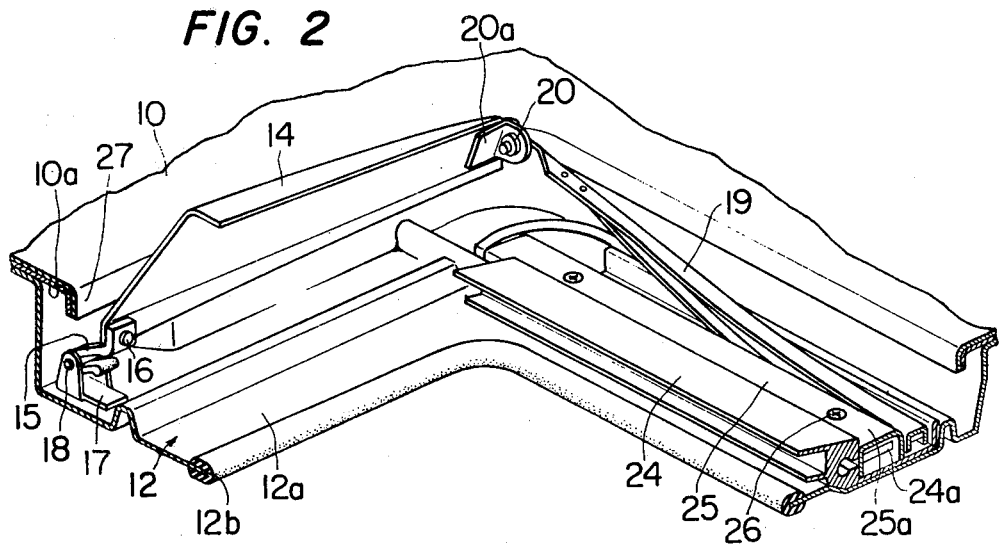
FIG. 2 is a perspective top plan view of the right-hand and forward half of vehicle roof with upward open the deflector.

Referring to FIG. 1, which shows a general view of the vehicle roof, an aperture 13 is provided in a fixed part 10 of the roof and is arranged to be closed by moving forwardly a sliding roof panel 11. The edges of the aperture 13 are strengthened forwardly and laterally by a frame 12 which is rigidly connected to the fixed part 10 for example by means of welding, as best shown in FIG. 2 at the left. The frame 12 carries a pair of parallel longitudinal guide rails 24 for guiding the sliding roof panel 11 at its side edges though only the right hand parts will be described herein. The guide rail 24 extends rearwardly below the fixed roof part 10 in excess of the longitudinal length of the aperture 13 so that the panel 11 is retractable into the marginal portion of aperture 13 as best shown in dotted line in FIG. 1. Arranged on the forward transverse portion of the frame 12 is a wind deflector 14 which is enabled to swing through an angle from the inoperative position below the surface of the roof when the roof panel shuts to an operative position in which it is in transverse direction to the air slip stream.

Figure 4:
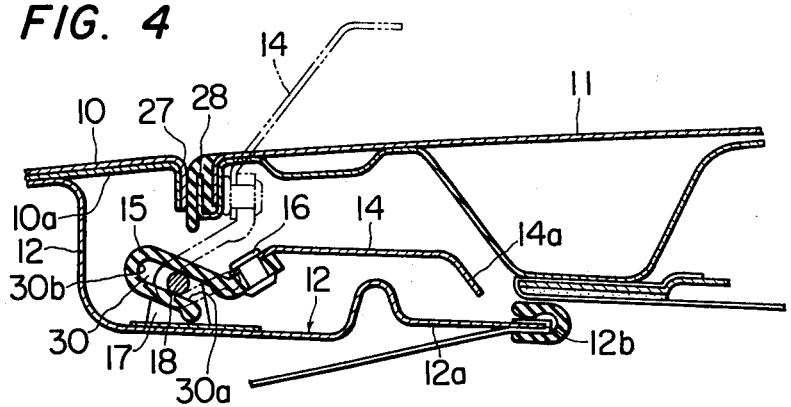
FIG. 4 is a cross sectional view taken along the line IV — IV in FIG. 3.
Figure 5:
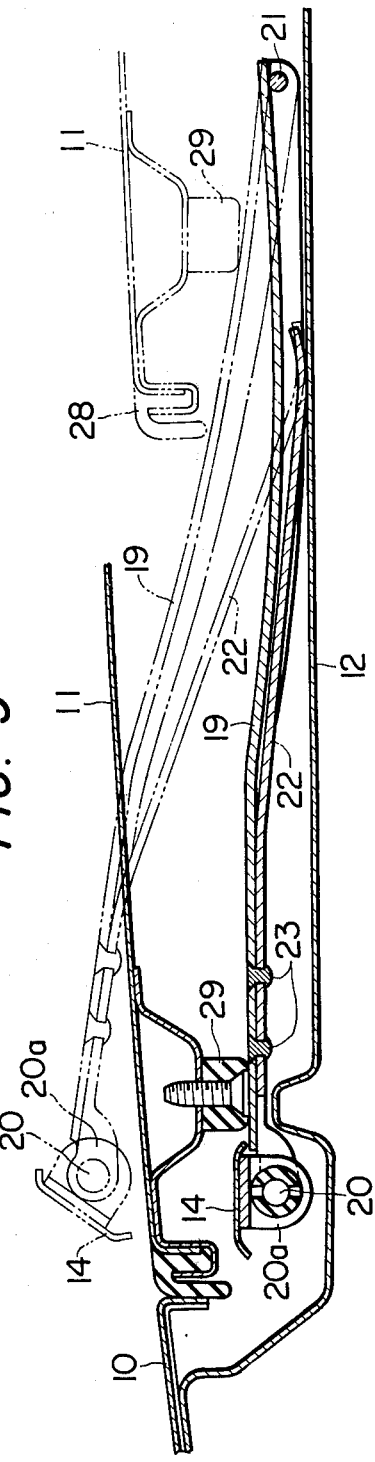
FIG. 5 is a longitudinal cross sectional view taken along the line V — V in FIG. 3.

What has been thus far described is general and known structure in the art. The embodiment is hereinbelow described in greater detail. The embodiment is provided with at its aforementioned transverse portion of the frame 12 an approximately horizontal flanged portion 12a which extends inwardly of the aperture 13 and supports a pair of spaced stud members 17 fixed thereto as best shown in FIG. 2 at the left. A hinge pin 18 is carried by each stud 17 to provide a transverse axis for the deflector 14 to oscillate thereabout and to permit the same to slide in the normal direction relative to the axis as explained as the discussion proceeds. A pair of arms 15 are fastened to the deflector 14 at its lower edge by means of, for example a rivet 16 as shown in FIG. 4. The arm 15 is usually formed of the suitable synthetic resin material and has a U-shaped and elongated slot or open hole 30 within which the pin 18 is free to slide and to rotate. The other edge of the deflector 14 opposed to that to which are fastened the above mentioned arbours 15 carries at least a pair of pivot pins 20 by means of a stud 20a (one of the pins 20 is shown in FIG. 2 at the middle top). By means of the pin 20, a pair of arms 19 are pivoted to the deflector 14 at its one end and are pivoted to longitudinally extending cover members 25 (FIG. 2) by means of a pin 21 (FIG. 5). The flanged portion 25a of the cover member 25, the flanged portion 24a of the guide rail 24 and the frame 12 are piled up one above the other to build a sandwiched heap and are riveted as shown at 26 in FIG. 2 to provide firm connection of these three parts. From the foregoing it will be understood that the arm 19, deflector 14 and the frame 12 form a linkage mechanism in which pivoting pin 18 on the frame 12 has a sliding fit on the deflector 14 at its lower edge.

FIG. 5 is a longitudinal section through the vehicle roof taken near the right hand end of the air deflector. A metal spring 22 is, according to FIG. 5, though only the right hand parts will be described also herein, riveted at its one end to the arm 19 as at 23 in the view and at its rear end is resiliently in abutment against the frame 12 as seen in FIG. 5. The arm 19 is normally urged toward clockwise oscillation about the pin 21 by that spring. The tension of the spring is chosen to press the deflector and the arms together upwards into its operative position normally. The pretension of the spring 22 is such that the forward terminal end 30b on the profile of the slot 30 bears resiliently against the pin 18 on its profile, with the result that the air deflector 14 is prevented from vibration when the vehicle is travelling with the deflector in its upward operative position as shown in phantom in FIG. 4. It is evident that the upward spring urging of the arm 19 can also be made in suitable structural manner so that the arm 19 is normally spring biased toward clockwise oscillation.

In FIG. 5, the arm 19 is shown at each end of its stroke. The lowered extreme position is shown in full lines. The upward extreme position is shown in dot-and-dash line. The arm 19 occupies the upward extreme position by being urged by the spring 22 while occupies the lowered position by being downward pressed against the spring. As shown in FIG. 5, the sliding roof 11 is provided with on its under side a slide 29 so located as to run on the upper surface of the arm 19 ascending at an incline and thereby gradually swings the arm 19 downwards into its lowered position as the shutting movement progresses. The downward oscillating movements of the arm 19 is transmitted to the deflector 14 in angularly increased proportion until it reaches the retracted inoperative position in the front portion of the aperture as shown in FIG. 4. The reverse movement of the sliding roof 11 causes the reversal to be taken as is understood by tracing the linkage mechanism. During the oscillating of the deflector 14, the slot 30 of each arm 15 provides means to allow the deflector 14 to oscillate about the hinge pin 18 while permitting the arm 15 to slide on the pin along the slot 30.

In order to completely understand the feature of the device according to the invention, the following consideration will be helpful.

If the arm 15 were pivoted to the stud 17 by means of an ordinary hinge pin in a manner such that only swinging of the deflector is permissible about the pin, the deflector 14 would be obliged, for the purpose, to be connected to the arm 19 at the other end so as to be enabled to rotate and slide each other in the same manner as that of the hinge pin 18 and the slot 30.

In the above inactually assumed mechanism, it is apparent that the rearwardmost end 14a of the deflector 14 (FIG. 4) will be an appreciable distance apart, rearwardly, from the location shown in full line. This is considered to be a defect in such type of roof device of the vehicle as may be seen in the conventional types, in that the cutting off portion of the effective area of the aperture is larger than that of the invention.

As is apparent in FIG. 4, the hinge pin 18 occupies the rearwardmost end 30a of the slot 30 when the deflector 14 is in the rest position whereas it occupies the forwardmost end 30b when the deflector is in the operative position so that the angular position of the deflector in the operative position is determined.

Such calculation and arrangement are effective in substantially saving a space occupied by the deflector so that the rearward edge 12b of the flange portion 12a may locate in design smaller distance apart from the forwardmost end of the roof. This is accordingly effective to attain a larger effective area of the aperture, or to reduce the cutting off portion of the aperture.

Further it may be safely mentioned that the deflector 14, arm 19, and frame 12 of the device form one type of link and lever arrangement. The arrangement beneficially provides toggle action somewhat like self-locking against the reversal of the lever moments exhibited by the deflector 14 when the driving lever or arm 19 is at the upper extreme end of its stroke.

Such reversal of the deflector 14 results from a high speed air stream with the deflector pressed far back towards the rear when the vehicle runs at a higher speed.

In the above mentioned assumed type, an additional means is required to be equipped for providing specifically the toggle action when the deflector is in operative position over the roof surface.

Figure 7:
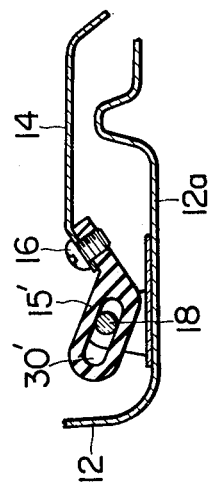
FIG. 7 is a similar view to that of FIG. 4 showing another embodiment of the invention and illustrating only in sofar as it is believed to be necessary for understanding of the embodiment.
Figure 6:
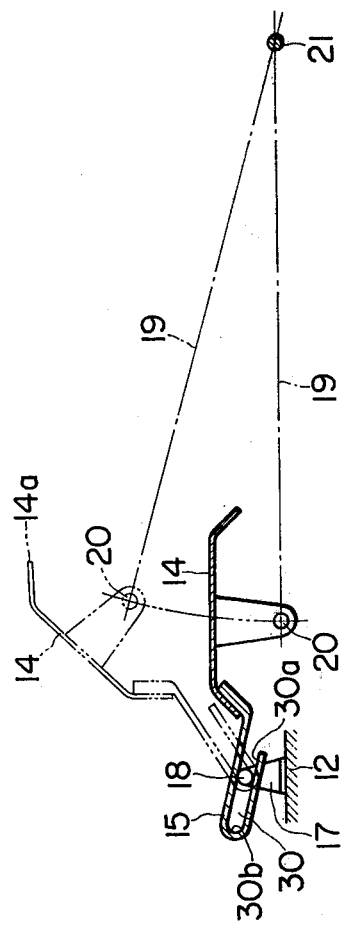
FIG. 6 is a view showing movement of the arrangements formed of the deflector and its associating parts with some of them shown in phantom.

In FIG. 7 is shown another embodiment of the invention. In the embodiment, an arm 15' corresponding to the arm 15 of the first embodiment is formed with an enclosed elongated hole in which is a sliding fit the hinge pin 18. The other parts of the embodiment are identical with the respectively corresponding parts of the first embodiment so that the same reference characters are used in FIG. 7.

What is claimed is:

1. In a motor vehicle having a roof, an aperture in the roof and a sliding roof portion movable between retracted and extended positions for respectively opening and closing said aperture, the improvement comprising;
   a frame along opening edges of the aperture for strengthening the aperture,
   an air deflector mounted on the frame adjacent a front edge of the aperture for diverting the air stream with the roof portion retracted,
   swingable arm means pivoted to the deflector at one end and at the other end carried by the frame in the path of the sliding roof portion in driven abutment engagement therewith, and
   control means for controlling the deflector in shifting between the operative position and inoperative position, said control means including an arm fixed to said deflector and having a cam slot opened at one end and a hinge pin fast on the frame and having a sliding fit within the cam slot to thereby control movement of the deflector between operative and inoperative positions and attitude of the deflector in either position.

2. In a motor vehicle having a roof, an aperture in the roof and a sliding roof portion movable between retracted and extended positions for respectively opening and closing said aperture, the improvement comprising:
   a frame along opening edges of the aperture for strengthening the aperture,
   an air deflector mounted on the frame adjacent a front edge of the aperture for diverting the air stream with the roof portion retracted,
   swingable arm means pivoted to the deflector at one end and at the other end carried by the frame in the path of the sliding roof portion in driven abutment engagement therewith, and
   control means for controlling the deflector in shifting between the operative position and inoperative position, said control means including an arm fixed to said deflector and having a closed and elongated cam hole and a hinge pin fast on the frame and having a sliding fit within the cam hole to thereby control movement of the deflector between operative and inoperative positions and attitude of the deflector in either position.

* * * * *